(12) United States Patent
Gopalakrishna

(10) Patent No.: US 10,078,927 B2
(45) Date of Patent: Sep. 18, 2018

(54) SYSTEMS AND METHODS FOR TIME-BOUND HOMOGENOUS CONSECUTIVE EVENTS TRIGGERING A PROCEDURE IN AN ACCESS CONTROL HOST SYSTEM

(71) Applicant: Honeywell International Inc., Morristown, NJ (US)

(72) Inventor: Rajesh Gopalakrishna, Sterling, VA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/412,168

(22) Filed: Jan. 23, 2017

(65) Prior Publication Data

US 2018/0211458 A1    Jul. 26, 2018

(51) Int. Cl.
*G08B 19/00* (2006.01)
*G08B 25/14* (2006.01)
(Continued)

(52) U.S. Cl.
CPC .......... *G07C 9/00103* (2013.01); *B60R 25/24* (2013.01); *B60R 25/246* (2013.01);
(Continued)

(58) Field of Classification Search
CPC .............. G07C 9/00682; G07C 9/0069; G07C 2009/00746; G07C 9/00309; G07C 2009/0023; G07C 2009/00396; G07C 2009/00642; G07C 2009/00801; G07C 2209/14; G07C 2209/64; G07C 2209/65; G07C 9/00007; B60R 11/04; B60R 2011/004; B60R 25/24; B60R 25/246; G01N 33/227; G08B 13/1672; G08B 19/00; G08B 25/016; G08B 25/14; G08B 29/188; G08B 25/001; G08B 25/085; G08B 27/005; G08B 7/06; H04R 29/004;
(Continued)

(56) References Cited

U.S. PATENT DOCUMENTS 4,962,473 A * 10/1990 Crain ................... G08B 19/00
340/539.2
9,460,591 B2    10/2016 Gu et al.
(Continued)

OTHER PUBLICATIONS

Honeywell (/arcatcos/cos48/arc48331.html) Section 28 10 00 Access Control, 2015, http://www.arcat.com/sdspecs/htm04/28_10_00hsg.htm.
(Continued)

*Primary Examiner* — Dionne H Pendleton
(74) *Attorney, Agent, or Firm* — Husch Blackwell LLP

(57) ABSTRACT

Systems and methods for time-bound homogeneous consecutive events triggering a procedure in an access control host system are provided. Some methods can include receiving notifications of a plurality of events occurring in an access control system, identifying an event trigger when at least some of the plurality of events are homogeneous, time-bound, and consecutive, and, responsive to identifying the event trigger, transmitting an instruction to at least one device in the access control system for execution of a procedure associated with the event trigger.

12 Claims, 1 Drawing Sheet

(51) Int. Cl.
*G07C 9/00* (2006.01)
*G08B 25/01* (2006.01)
*B60R 25/24* (2013.01)
*G08B 13/16* (2006.01)

(52) U.S. Cl.
CPC ....... *G08B 13/1672* (2013.01); *G08B 25/016* (2013.01); *G07C 2009/00746* (2013.01); *G07C 2209/14* (2013.01)

(58) Field of Classification Search
CPC .......... E05B 81/77; E05B 81/78; G01S 13/56; G06F 17/30887
See application file for complete search history.

(56) References Cited

U.S. PATENT DOCUMENTS

| | | |
|---|---|---|
| 2002/0067259 A1 | 6/2002 | Fufidio et al. |
| 2009/0051528 A1 | 2/2009 | Graichen |
| 2013/0293718 A1 | 11/2013 | M et al. |
| 2013/0314232 A1 | 11/2013 | Jerhotova et al. |
| 2015/0235536 A1 | 8/2015 | Libal et al. |
| 2016/0209390 A1* | 7/2016 | Overcast ............... G01N 33/227 |
| 2017/0166168 A1* | 6/2017 | Hache .................... B60R 25/24 |
| 2017/0243424 A1* | 8/2017 | Shirai ................ G07C 9/00309 |

OTHER PUBLICATIONS

Extended European search report for corresponding EP application 17206633.4, dated Jun. 13, 2018.

* cited by examiner

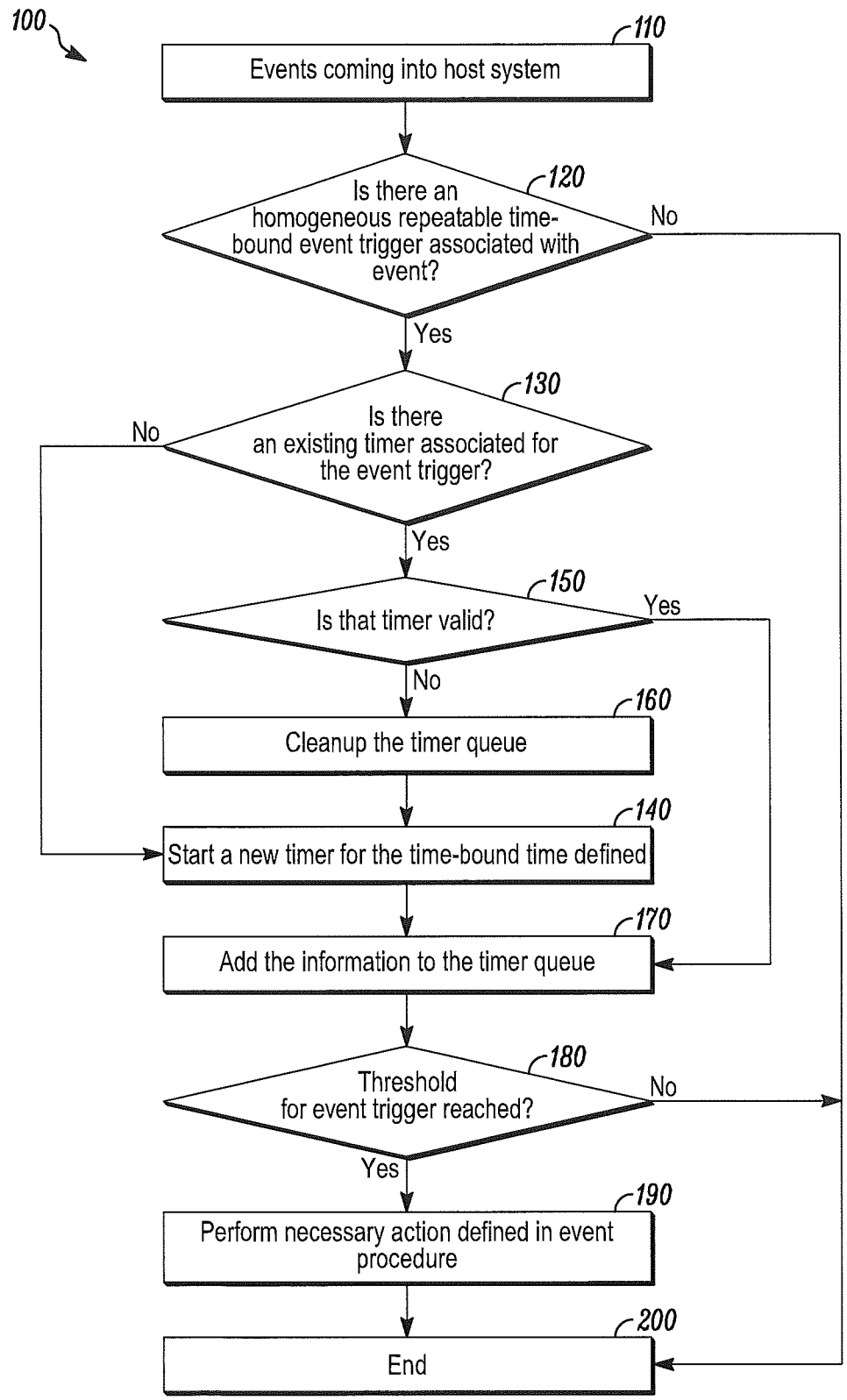

SYSTEMS AND METHODS FOR TIME-BOUND HOMOGENOUS CONSECUTIVE EVENTS TRIGGERING A PROCEDURE IN AN ACCESS CONTROL HOST SYSTEM

FIELD

The present invention relates generally to access control systems. More particularly, the present invention relates to systems and methods for time-bound homogeneous consecutive events triggering a procedure in an access control host system.

BACKGROUND

Those of skill in the art understand that a trigger defines a set of events or rules that, when met, causes a procedure, that is, another set of actions, to be executed. Examples of events that can trigger a procedure in an access control system include, but are not limited to, a valid card access event occurring from a card reader, an unknown card event occurring on an identified date and time, a forced door event occurring on an identified date and time, a motion sensor activated event occurring from an input point, and a relay activated event occurring from an output point. Examples of procedures that can be executed in an access control system include, but are not limited to, input actions, such placing as an arm or shunt at an input point, CCTV actions, such as executing a CCTV command, reader actions, such as setting a reader mode to card only, card and pin, or pin only, output actions, such as activating or deactivating an output point, intrusion specific actions, such as sending an intrusion specific command, such as arm group, bypass zone, or the like, and other actions, such as sending an email notification.

In known access control systems, it is challenging for various stakeholders, such as a user or a guard monitoring a host system or a central station, a security dealer or integrator, an IT user, or a hardware administrator, to make informed decisions in real time when something beyond what is normal occurs repeatedly within a given period of time. Indeed, stakeholders often become aware of such repeating events after the occurrence thereof, thereby delaying making appropriate decisions and executing appropriate actions responsive thereto.

Some examples of the above include, but are not limited to the following. When a faulty device reports a large number of false alarms within an identified period of time, a stakeholder or a central monitoring station may want to immediately auto-shunt events from the faulty device and dispatch a technician to the faulty device. When an unusually high number of events are reported from a device within an identified period of time that is beyond permissible limits, especially when such a device does not otherwise report a significant number of events, a stakeholder may want to more closely monitor the device. When a controller goes offline after attempting to connect an identified number of times beyond the threshold limits, a stakeholder may want to immediately and automatically launch an investigation into the offline occurrences, such as by dispatching a technician, sending an email, or the like. When a card holder goes through a door or a multitude of doors several times within an identified period of time that is of interest to a stakeholder, the stakeholder may want to more closely monitor the card holder or the door. When a high security zone of interest is accessed more often than the normal permissible limits in an identified period of time, a stakeholder may want to more closely monitor the high security zone. When a card is used beyond an identified number of times within an identified period of time, a stakeholder may want to restrict or flag the card. When a card holder is unable to obtain access to a valid access door due to configuration issues, such as the card holder swiping his card several times to open a door, a stakeholder may want to initiate an investigation of the card holder's access card, the access door, or a card reader proximate the access door. When a special card is swiped an identified number of times within an identified period of time, such as three valid card swipes within five seconds on a perimeter door of a facility or five valid card swipes within thirty seconds on an interior door of the facility, a stakeholder may want to arm or disarm the facility accordingly. When a tailgater in a facility with multiple anti-pass back violations is identified, a stakeholder may want to take prompt corrective action, such as training the tailgater, launching an investigation, or the like. Finally, when a door generates a door held open alarm within an identified period of time, a stakeholder may want to automatically adjust the held open time for triggering such an alarm.

However, as explained above, known access control systems do not assist a stakeholder in automatically identifying any of the above-identified events or automatically causing any of the above-identified procedures to be executed responsive thereto. Therefore, there is a continuing, ongoing need for improved systems and methods.

BRIEF DESCRIPTION OF THE DRAWINGS

FIG. 1 is a flow diagram of a method in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for time-bound homogeneous consecutive events triggering a procedure in an access control host system. For example, an access control host system can monitor a plurality of events occurring in the access control system and identify those events in the plurality of events that are homogeneous, time-bound, and consecutive. As used herein, it is to be understood that homogeneous events can include identical events occurring in a system, for example, the same type of event that occurred at the same device using the same card. Furthermore, as used herein, it is to be understood that time-bound events can include events that occur within an identified period of time. Finally, as used herein, it is to be understood that consecutive events can include events that repeatedly occur an identified number of times.

In accordance with disclosed embodiments, systems and methods disclosed herein can define a trigger or triggering criteria to include input actions that are an identified homogenous type of event, that occur in consecutive order an identified number of times, and that occur within a time-bound identified period of time. Further, systems and methods disclosed herein can cause a procedure to be executed responsive to detecting such a trigger or triggering criteria being met.

It is to be understood that events as disclosed and described herein can include, but are not limited to, card and non-card related events from a plurality of devices including, but not limited to, a reader device, an input device, an output device, a panel, a controller, a sub-panel, or an IO board.

FIG. 1 is a flow diagram of a method 100 in accordance with disclosed embodiments. As seen in FIG. 1, the method 100 can include a host system identifying an incoming event as in 110 and determining whether a time-bound homogeneous consecutive event trigger is associated with the incoming event as in 120. If not, then the method 100 can terminate as in 200.

However, when the method 100 determines that there is a time-bound homogeneous consecutive event trigger associated with an incoming event as in 120, the method 100 can include determining whether there is an existing timer associated with the time-bound homogeneous consecutive event trigger as in 130. If not, then the method 100 can include starting a new timer for defining a time-bound time as in 140.

However, when the method 100 determines that there is an existing timer associated with the time-bound homogeneous consecutive event trigger as in 130, the method can determine whether the existing timer is valid as in 150. If not, then the method 100 can include cleaning up or updating the timer queue as in 160 and starting a new timer for defining a time-bound time as in 140.

After the method 140 starts a new timer for defining a time-bound time as in 140 or when the method 100 determines that the existing timer is valid as in 150, the method 100 can include adding timer information to the timer queue as in 170 and determining whether a threshold for the time-bound homogeneous consecutive event trigger has been reached as in 180. If not, then the method can terminate as in 200. However, when the method 100 determines that the threshold for the time-bound homogeneous consecutive event trigger has been reached as in 180, the method 100 can include performing any necessary actions defined in a procedure triggered by the time-bound homogeneous event trigger as in 190.

It is to be understood that systems and methods disclosed herein can automatically identify events, including those described and disclosed in the Background above, that trigger a procedure, including those described and disclosed in the Background above, to be executed responsive thereto. For example, in accordance with disclosed embodiments, systems and methods disclosed herein can configure a time-bound homogeneous consecutive event trigger one time, automatically identify events that meet the trigger in real time, automatically execute a procedure triggered by the events meeting the trigger, and provide a notification to a stakeholder of the same.

In some embodiments, systems and methods disclosed herein, including a host system as disclosed and described above and herein, can receive and monitor events from a plurality of controllers that may have different hardware manufacturers, can identify when events from the plurality of controllers meet an event trigger, and can execute procedures in connection with the plurality of controllers.

It is to be understood that the systems and methods as disclosed and described above, including a host system as disclosed and described above, can be implemented with a transceiver device, a memory device, and a timing device, each of which can be in communication with control circuitry, one or more programmable processors, and executable control software as would be understood by one of ordinary skill in the art. In some embodiments, the transceiver device can communicate with system devices, such as card readers, in some embodiments, the memory device can store a record of received events, and in some embodiments, the timing device can execute a timer. In some embodiments, the executable control software can be stored on a transitory or non-transitory computer readable medium, including, but not limited to, local computer memory, RAM, optical storage media, magnetic storage media, flash memory, and the like, and some or all of the control circuitry, the programmable processors, and the control software can execute and control at least some of the methods described above.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   receiving notifications of a plurality of events occurring in an access control system;
   determining a respective type of each of the plurality of events;
   using the respective type of each of the plurality of events to identify whether a preconfigured homogeneous repeatable time-bound event trigger is associated with each of the plurality of events;
   identifying an event trigger threshold when a preset number of the plurality of events associated with the preconfigured homogeneous repeatable time-bound event trigger are identified within a preset time period; and
   responsive to identifying the event trigger threshold, transmitting an instruction to at least one device in the access control system for execution of a procedure associated with the event trigger threshold.

2. The method of claim 1 wherein the preset number of the plurality of events associated with the preconfigured homogeneous repeatable time-bound event trigger occur at a single device in the access control system or are associated with a single access card.

3. A system comprising:
   a transceiver device;
   a programmable processor; and
   executable control software stored on a non-transitory computer readable medium,
   wherein the transceiver device receives notifications of a plurality of events occurring in an access control system, and
   wherein the programmable processor and the executable control software determine a respective type of each of the plurality of events, use the respective type of each of the plurality of events to identify whether a preconfigured homogeneous repeatable time-bound event trigger is associated with each of the plurality of events, identify an event trigger threshold when a preset number of the plurality of events associated with the preconfigured homogeneous repeatable time-bound event trigger are identified within a preset time period, and responsive to identifying the event trigger threshold, transmit an instruction, via the transceiver device, to at least one device in the access control system for execution of a procedure associated with the event trigger threshold.

4. The system of claim 3 wherein the preset number of the plurality of events associated with the preconfigured homogeneous repeatable time-bound event trigger occur at a single device in the access control system or are associated with a single access card.

5. A method comprising:
receiving a notification of an incoming event in an access control system;
determining a type of the incoming event;
using the type of the incoming event to determine whether a preconfigured time-bound homogeneous consecutive event trigger is associated with the incoming event;
identifying a valid timer associated with the preconfigured time-bound homogenous consecutive event trigger;
adding timing information associated with the incoming event to the valid timer;
determining whether a threshold for the preconfigured time-bound homogeneous consecutive event trigger has been reached; and
when the threshold for the preconfigured time-bound homogeneous consecutive event trigger has been reached, executing an action defined in a procedure associated with the preconfigured time-bound homogeneous consecutive event trigger.

6. The method of claim 5 wherein identifying the valid timer associated with the preconfigured time-bound homogeneous consecutive event trigger includes starting the valid timer for the preconfigured time-bound homogeneous consecutive event trigger.

7. The method of claim 5 further comprising updating a timer queue of the valid timer.

8. The method of claim 5 wherein determining whether the threshold for the preconfigured time-bound homogeneous consecutive event trigger has been reached includes identifying that the incoming event is identical to a plurality of events previously detected in the access control system.

9. The method of claim 8 wherein identifying that the incoming event is identical to the plurality of events previously detected in the access control system includes identifying that the incoming event and the plurality of events occurred at a single device in the access control system or that the incoming event and the plurality of events are associated with a single access card.

10. The method of claim 8 wherein determining whether the threshold for the preconfigured time-bound homogeneous event trigger has been reached includes identifying that the incoming event occurred within a period of time of the plurality of events occurring, and wherein the period of time is identified by the valid timer.

11. The method of claim 8 wherein determining whether the threshold for the preconfigured time-bound homogeneous event trigger has been reached includes identifying that the incoming event is a repetition of one of the plurality of events.

12. The method of claim 8 wherein executing the action defined in the procedure includes transmitting an instruction to at least one device in the access control system for execution of the procedure.

* * * * *